United States Patent
Regler

(10) Patent No.: US 9,931,727 B2
(45) Date of Patent: Apr. 3, 2018

(54) HONING MACHINE COMPRISING A FORCE SENSOR AND TELEMETRY SIGNAL AND ENERGY TRANSMISSION

(71) Applicant: KADIA Produktion GmbH + Co., Nürtingen (DE)

(72) Inventor: Roland Regler, Georgensgmünd (DE)

(73) Assignee: Kadia Produktion GmbH + Co., Nurtingen (DE)

( * ) Notice: Subject to any disclaimer, the term of this patent is extended or adjusted under 35 U.S.C. 154(b) by 172 days.

(21) Appl. No.: 14/436,446

(22) PCT Filed: Oct. 11, 2013

(86) PCT No.: PCT/EP2013/071371
§ 371 (c)(1),
(2) Date: Apr. 16, 2015

(87) PCT Pub. No.: WO2014/060326
PCT Pub. Date: Apr. 24, 2014

(65) Prior Publication Data
US 2015/0283667 A1 Oct. 8, 2015

(30) Foreign Application Priority Data
Oct. 19, 2012 (DE) .......................... 10 2012 219 099

(51) Int. Cl.
*B24B 49/00* (2012.01)
*B24B 33/08* (2006.01)
(Continued)

(52) U.S. Cl.
CPC .......... *B24B 33/087* (2013.01); *B23Q 1/0009* (2013.01); *B23Q 17/0966* (2013.01);
(Continued)

(58) Field of Classification Search
USPC .............................. 451/11, 51, 477, 478, 540
See application file for complete search history.

(56) References Cited

U.S. PATENT DOCUMENTS 2,696,601 A * 12/1954 Hilburn .................. G08C 15/08
327/414
2,870,577 A * 1/1959 Seborg .................... B24B 33/06
451/155

(Continued)

FOREIGN PATENT DOCUMENTS

CN 1046027 A 10/1990
CN 202097650 U 1/2012
(Continued)

OTHER PUBLICATIONS

International Search Report issued in connection with PCT/P2013/071371.
(Continued)

*Primary Examiner* — Joseph J Hail
*Assistant Examiner* — Shantese McDonald
(74) *Attorney, Agent, or Firm* — Akerman LLP

(57) ABSTRACT

A honing machine (100) for honing rotationally symmetrical bore holes in workpieces has a honing spindle (120), which is movably mounted in a spindle housing (130), is rotatable about a spindle axis (122) by means of a rotary drive (140), can be driven in an oscillating manner parallel to the spindle axis by means of a lifting drive (150) and has at a tool-side end means for securing a honing tool arrangement (200), which has a tool body (220) carrying at least one honing element, which by axial displacement of a tool-side expanding element (330) that is axially displaceable inside the tool body can be infed radially in relation to a tool axis (214) and can be pressed by a pressing force against an inner side of a bore hole to be machined. Also provided is an expanding system with a machine-side expanding rod (310), which is (Continued)

guided inside the honing spindle (120), is axially displaceable by means of an expanding drive (320) in relation to the honing spindle and has a tool-side end portion (314), for coupling onto the tool-side expanding element (330). The honing machine has a control device (400) for controlling operating movements of the honing spindle and the expanding system and a force measuring system with a force sensor (500) for generating a sensor signal proportional to the pressing force and a transmission path for transmitting the sensor signal or a signal derived therefrom to the control device. The force sensor (500) is arranged in the region of the tool-side end portion (314) of the machine-side expanding rod (310) and is connected to the control device by way of a telemetric transmission path.

11 Claims, 2 Drawing Sheets

(51) Int. Cl.
*B24B 33/10* (2006.01)
*B23Q 1/00* (2006.01)
*B23Q 17/09* (2006.01)
*B24B 33/02* (2006.01)

(52) U.S. Cl.
CPC .............. *B24B 33/02* (2013.01); *B24B 33/10* (2013.01); *B24B 33/105* (2013.01)

(56) References Cited

U.S. PATENT DOCUMENTS

| | | | | |
|---|---|---|---|---|
| 5,160,925 | A | * 11/1992 | Dailey | ............. E21B 47/011 175/40 |
| 2008/0305716 | A1 | 12/2008 | Tashiro et al. | |
| 2009/0280743 | A1 | 11/2009 | Gast et al. | |
| 2010/0029179 | A1 | * 2/2010 | Cloutier | ............. B23Q 15/225 451/9 |
| 2010/0197199 | A1 | 8/2010 | Flores et al. | |
| 2011/0223833 | A1 | 9/2011 | Rauscher et al. | |

FOREIGN PATENT DOCUMENTS

| | | |
|---|---|---|
| DE | 35 37 172 A1 | 4/1987 |
| DE | 43 12 411 C1 | 6/1994 |
| DE | 196 06 145 A1 | 8/1997 |
| DE | 103 43 682 A1 | 4/2005 |
| DE | 10 2006 028 728 A1 | 12/2007 |
| DE | 10 2007 024 503 B3 | 8/2008 |
| DE | 10 2009 059 131 A1 | 8/2010 |
| DE | 102009059131 A1 | 8/2010 |
| EP | 0 575 657 A1 | 12/1993 |

OTHER PUBLICATIONS

German Search Report issued in connection with corresponding German Application No. 10 2012 219 099.6.

* cited by examiner

HONING MACHINE COMPRISING A FORCE SENSOR AND TELEMETRY SIGNAL AND ENERGY TRANSMISSION

This application is a national phase of PCT/EP2013/071371, filed Oct. 11, 2013, and claims priority to DE 10 2012 219 099.6, filed Oct. 19, 2012, the entire contents of which are hereby incorporated by reference.

BACKGROUND

The invention relates to a honing machine for honing rotationally symmetrical bore holes in workpieces according to the preamble of claim 1.

Honing is a method of cutting by means of geometrically undefined cutters, in which a honing tool performs a cutting movement consisting of two components and there is constant surface contact between one or more cutting material bodies of the honing tool and the inner surface of the bore hole to be machined. The kinematics of an expandable honing tool are characterized by simultaneous execution of a rotational movement, an oscillating lifting movement, proceeding in the axial direction of the bore hole, and an expanding movement, which leads to changing of the effective diameter of the honing tool. A surface structure with crossing machining traces is obtained on the inner surface of the bore hole. Surfaces finished by honing can meet extremely high requirements with respect to dimensional and geometrical tolerances, so that many sliding surfaces that are subjected to great loading in engines or engine components, for example cylinder liners in engine blocks, or inner surfaces of bore holes in housings of injection pumps, are machined by honing.

During honing, the abrasive cutting material bodies are pressed against the inner surface of the bore hole by a pressing force. Along with the effective cutting speed and the type of cutting material bodies, the pressing force is an important machining parameter for influencing the machining result from the machine side. The pressing force can be controlled by the expansion of the honing tool.

In the case of some honing methods there is the desire to be able to set the pressing force as accurately as possible, in order that the honing machining can be controlled while taking the pressing force into account. There are already various proposals for generating a sensor signal proportional to the pressing force with the aid of a force sensor provided at a suitable location and using the signal for controlling the honing process.

DE 35 37 172 C2 discloses a honing machine with a device for controlling the operating pressure of a hydraulically acted-upon actuating part of a honing tool. The hydraulically operated actuating part acts in this case on an expanding cone that is provided inside the honing tool and infeeds the honing sticks in the radial direction against the workpiece to be machined. The force exerted on the expanding cone is measured by means of a force sensor. The operating pressure of the hydraulic device is controlled on the basis of a predetermined force profile. The force sensor is arranged between the hydraulically adjustable actuating part and the expanding cone, a spring also being interposed between the force sensor and the hydraulic actuating part. The force measurement is intended thereby to allow the setting of a defined force profile independently of internal losses in the hydraulic system. Details of the transmission of the signals of the force sensor to the control are not disclosed.

EP 0 575 657 A1 describes honing methods in which it is envisaged inter alia to continuously measure the infeeding force acting on expandable honing sticks during the honing process and feed it as a signal to a control. In a honing machine that is only schematically represented, an infeeding device is provided, connected to the control of the honing machine and connected to a honing tool by way of a load cell. The infeeding device has a threaded spindle, which is movable by motor in the axial direction and is transmitted by way of the load cell directly to an infeed rod, which engages in the honing tool. The measured values of the load cell are fed as a signal to the numerical control of the honing machine by way of a line. Details of the transmission of the signals to the control are not disclosed.

DE 196 06 145 A1 describes a device for expanding a honing tool with at least one infeedable honing face, which has an expanding mechanism for infeeding the tool and a force measuring unit for measuring an infeeding force of the expanding mechanism. The force measuring unit is arranged on a portion of the expanding mechanism that is rotationally at rest. This makes it possible to dispense with a complex transmission of the signals of the force measuring unit between a rotating component and a portion that is rotationally at rest. Furthermore, disadvantages with respect to the stiffness of the expanding linkage can be avoided.

EP 2 000 258 A2 describes a honing method in which the reaction forces that occur when the honing stones are pressed against the inner surface of a bore hole to be machined are measured. The corresponding honing machine has sensors integrated in the honing tool for recording this reaction force. In the case of an exemplary embodiment, sensors for measuring the reaction force are arranged between the honing sticks and the honing stick carriers carrying the honing sticks. Details of the transmission of the sensor signals to the control are not disclosed.

PROBLEM AND SOLUTION

The invention addresses the problem of providing a honing machine with which it is possible to carry out honing methods that require measurement of the pressing force of the cutting material bodies or a force proportional thereto. It is intended here that a precise measurement should be possible without unnecessarily complicating the construction of the honing machine or the honing tool. It is optionally to be possible to design the force measuring system in such a way that existing honing machines can be retrofitted with a force measuring system by just a few simple actions.

To solve this problem, the invention provides a honing machine with the features of claim 1. Advantageous developments are specified in the dependent claims. The wording of all the claims is made the content of the description by reference.

According to the claimed invention, this problem is solved in the case of a honing machine of the generic type by the force sensor being arranged in the region of the tool-side end portion of the machine-side expanding rod and being connected to the control device of the honing machine by way of a telemetric transmission path. The force sensor is therefore provided on an element of the honing machine and as a result remains on the honing machine even when there is a tool change. It is consequently not necessary to use honing tools with an integrated force sensor, as a result of which the tool costs remain moderate. On the other hand, the arrangement in the tool-side end portion of the expanding rod has the effect that the force sensor is located in the flux of force very close to the cutting region of the honing tool arrangement, that is to say close to that region in which the pressing force to be determined or the associated reaction forces act. There are generally no transitions with associated mechanical play between the force sensor and the engaging region of the cutting material bodies on the inner wall of the bore hole and also no components that are necessarily elastically compliant on account of their construction, so that the forces occurring and measured at the location of the force sensor can for all practical purposes be regarded as proportional to the pressing force.

The sensor signal or a signal derived therefrom is transmitted to the control device over a telemetric transmission path. For the purposes of this application, there is a telemetric transmission path whenever at at least one point along the transmission path the signal transmission takes place without physical contact over a certain distance, so that part of the transmission path is not formed by an electrically conducting cable connection or physical electrical contact. It has been found that particularly low-interference signal transmission is possible in this way, which has advantageous effects on the precision of the control of the honing machine. By using sensor telemetry for the force measurement in the case of a honing machine, it is also possible to integrate a corresponding force measuring system with comparatively low structural complexity in a honing machine, in many cases also giving rise to the possibility of integrating a precisely operating force measuring system in an already finished honing machine without any great effort by way of retrofitting.

In the case of preferred embodiments, the transmission path has at least one physically contactlessly operating telemetric transformer unit, which has a first transformer element on a first component and a second transformer element on a second component that is separate from the first component, the first and second transformer elements being in transmission contact by way of an air gap that is formed between the components. A signal transmission in the near-field region can take place between the two transformer elements that are not in physical contact with one another, by way of the air gap. The transformer elements may for example be designed as inductive or capacitive transformers. The distance between the transformer elements may for example lie in the range below 50 mm or below 10 mm, in particular in the range between 0.5 mm and 5 mm. The limits are determined inter alia by the specifications of the installed amplifiers and antennas. Among the advantages offered by telemetric transmission in the near-field region is that the corresponding transformer elements can be automatically positioned exactly in relation to one another during the installation of the first and second components, so that low-loss physically contactless transmission is possible. At the same time, the first and second components can at any time be separated from one another without special measures being necessary for the disassembly of the telemetric transformer unit.

For example, the first transformer element may be provided on a first component that belongs to the honing machine, while the second transformer element may be arranged on a component that belongs to the honing tool arrangement, it being possible for example for this component to be a tool holder of the honing tool arrangement. It is also possible that a telemetric transmission takes place between two components that both belong to the honing machine.

In the transmission path there may be provided a first transformer unit, which has a first transformer element on the expanding rod and a second transformer element on the honing spindle or a component that is connected or can be connected to the honing spindle for rotation therewith, the first and second transformer elements being in (physically contactless) transmission contact in every axial relative position between the honing spindle and the expanding rod that occurs during operation. Consequently, a reliable signal transmission to the honing spindle or a component that is connected to the honing spindle for rotation therewith is ensured over the entire range of adjustment of the machine-side expanding rod.

In the case of some embodiments, the first transformer unit has a circular antenna, which encloses the expanding rod and the axial length of which is preferably at least as great as the axial range of adjustment of the expanding rod between the fully retracted position and the fully extended position. The use of a circular antenna ensures that the transmission contact is independent of the rotational position of the expanding rod that is obtained during the assembly of the expanding rod or the honing machine. Alternatively or in addition, it is also possible to form the second transformer element as a circular antenna that is closed in the circumferential direction (around the expanding rod). More simple antennas may also be used, it then being necessary during assembly to pay closer attention to their exact relative positioning in relation to one another.

The transmission path preferably has a second transformer unit, which has a first transformer element on the honing spindle or a component that is connected or can be connected to the honing spindle for rotation therewith (transformer element fixed to the spindle) and a second transformer element on the spindle housing or a component that is connected or can be connected to the spindle housing for rotation therewith (transformer element fixed to the housing), the first and second transformer elements being in transmission contact in every rotational position of the honing spindle that occurs during operation. Such a second transformer unit may also be referred to as a rotating transformer.

The transmission from the spindle housing or the component connected to the spindle housing for rotation therewith to the control device may take place in a line-bound manner, it optionally also being possible for sliding contacts or the like to be used. Telemetric transmission is likewise possible, for example by radio.

The transmission between the transformer elements may be realized by analog or digital transmission technology.

Particularly when machining bore holes with relatively small diameters, for example in the diameter range of 15 mm or less, often used are honing tool arrangements that have a honing tool with a tubular tool body, which is secured by an end portion in a tool holder and has at the opposite end portion a radially expandable cutting region. At least one radially infeedable honing stick may be arranged in the cutting region. The tool body then serves as a receptacle for one or more honing sticks and at the same time as a guide for a tool-side expanding element, which serves for the radial infeeding of the honing sticks. The radially expandable cutting region may also be designed as a slit sleeve, on the outer side of which a cutting face has been applied as a honing element. The tool holder serves on the one hand for receiving the tool body and on the other hand for securing the honing tool arrangement on the honing spindle of the honing machine.

In the case of some embodiments, such tool holders are connected to the honing spindle for rotation therewith and in such a way that they can be detached. For this purpose, the honing spindle may have a corresponding tool receptacle, for example a tool receptacle with an internal thread for screwing in a tool holder, or a tool receptacle with a conical clamping surface, into which a tool holder with a corresponding clamping cone is clamped. The end portion of the expanding rod that is provided with the force sensor preferably reaches into the region of the tool receptacle, so that the force sensor is located inside the tool holder when the tool holder is secured to the honing spindle.

In the case of some embodiments, the transmission path passes over the tool holder or through the tool holder, so that the transmission path is only closed when the tool holder is correctly mounted on the honing spindle.

The tool holder may have the second transformer element of the first transformer unit in a portion that is facing the expanding rod, while a first transformer element of the second transformer unit is arranged in a portion that is assigned to the spindle housing or a component rotatably connected to the spindle housing. Consequently, the transmission path can be completed by fitting such a tool holder or interrupted by removing a corresponding tool holder without special installation work being necessary for establishing the transmitting connection or disconnecting it when the tool holder is removed.

The power supply to the force sensor may take place in a line-bounded manner, for example through the expanding rod. It is also possible to provide a battery or a rechargeable battery for the power supply to the force sensor on or in the expanding rod. However, the power supply to the force sensor preferably takes place by way of the telemetric transmission path, from an external electrical power supply. For this purpose, one or more bidirectional transformer units may be provided, configured in such a way as to transmit signals from the force sensor in the direction of the control unit and energy for supplying electrical power to the force sensor in the direction of the force sensor. The energy transmission by way of an air gap may take place by induction.

The arrangement of a force sensor at the tool-side end portion of the expanding rod may be advantageous in the case of honing machines of the generic type independently of the telemetric transmission of the associated sensor signals, for example in conjunction with one or more sliding contacts between transformer elements of the transmission path that are movable with respect to one another.

The telemetric transmission path may be advantageous in the case of honing machines of the generic type independently of the arrangement of a force sensor at the tool-side end portion. The sensor telemetry may be used for example in conjunction with a force sensor that is arranged further away from the tool-side end of the expanding rod or in the honing tool.

These and other features emerge not only from the claims but also from the description and the drawings, where the individual features can be realized in each case by themselves or as a plurality in the form of subcombinations in an embodiment of the invention and in other fields and can constitute advantageous and inherently protectable embodiments. Exemplary embodiments of the invention are represented in the drawings and are explained in more detail below.

DETAILED DESCRIPTION OF PREFERRED EMBODIMENTS

Figure 1:
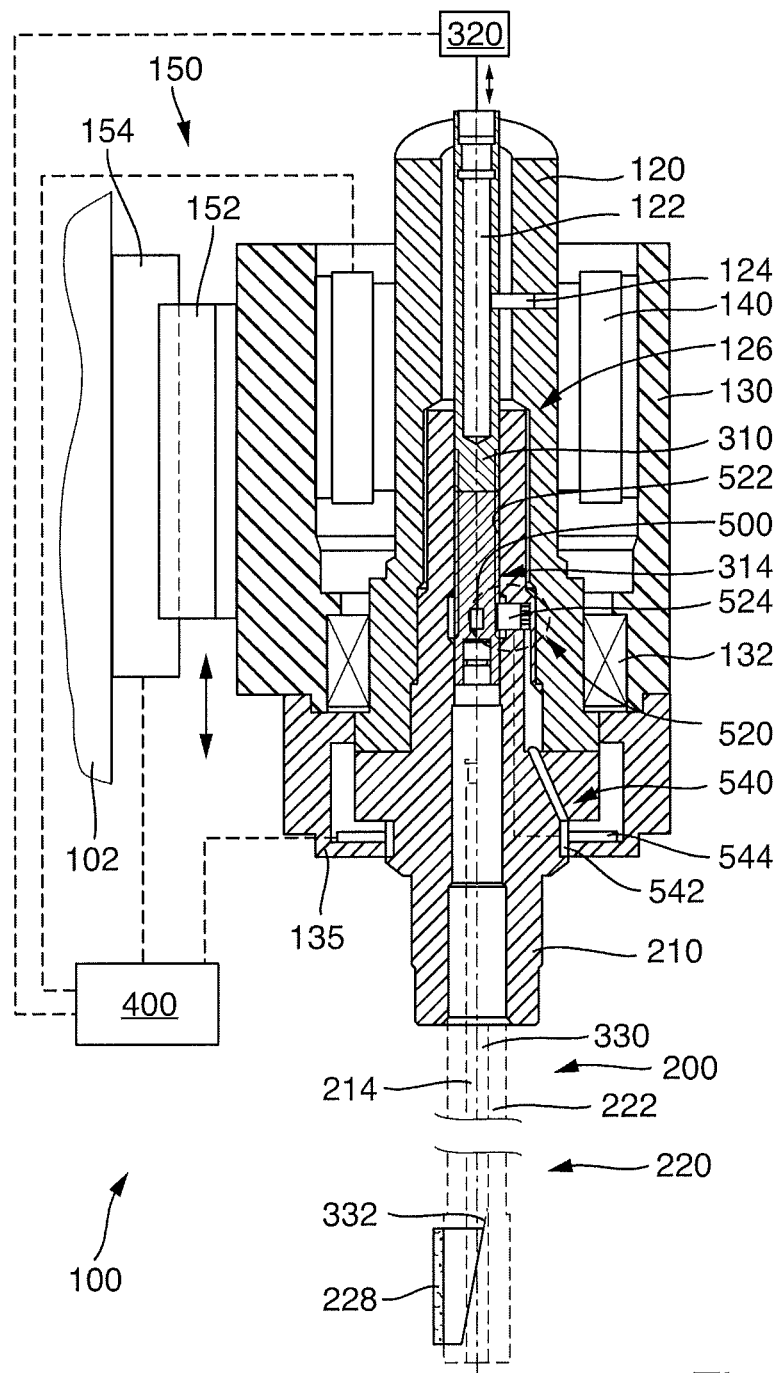
FIG. 1 shows parts of an embodiment of a honing machine according to the invention in the region of the interface between the honing spindle and the honing tool arrangement with the fully retracted expanding rod of the expanding system.

In FIG. 1, an embodiment of a honing machine 100 for honing rotationally symmetrical bore holes in workpieces is shown in the form of a detail. The honing machine has a honing spindle 120, which with a vertical spindle axis 122 is mounted rotatably about the spindle axis inside a spindle housing 130 by means of a number of axially offset rotary bearings 132. Provided as a rotary drive 140 for the honing spindle is an electric motor, which is arranged coaxially with the honing spindle, is integrated in the spindle housing and has a stator fixed to the housing and also a rotor secured to the honing spindle. The spindle housing and the honing spindle accommodated therein can be moved as a whole up and down in an oscillating manner parallel to the spindle axis, that is to say in the vertical direction, by means of a lifting drive 150. For this purpose, the spindle housing 130 is arranged on a running carriage 152, in which a secondary part of an electrical linear motor is integrated. The associated primary part of this direct linear drive is integrated in a vertical carriage support 154, which is secured to one side of a vertical column 102, which is supported by the machine bed (not shown) of the honing machine. For details of possible designs of these drives, reference is made to the applicant's DE 102 25 514 B4, the content of which is made the content of the present description by reference.

FIG. 1 shows the portion around the tool-side end of the honing spindle. At this end, means for securing a honing tool arrangement 200 are provided. For this purpose, the tool-side end of the honing spindle is expanded in a number of stages and forms a tool receptacle 126 with three cylindrical portions of different inside diameters, increasing toward the free end. Fitted into this tool receptacle in the operationally installed state of the honing machine is the honing tool arrangement 200, which is connected to the honing spindle rigidly, for rotation therewith and in a coaxial manner.

In the case of other embodiments that are not shown, a conical tool receptacle is provided.

The honing tool arrangement comprises a tool holder 210, which in the operationally installed state is screwed to the honing spindle coaxially therewith. Provided for this purpose are screws (not shown), which are arranged on pitch circles around the center axis, so that the tool holder can be connected to the tool receptacle by way of flat faces. The honing tool arrangement also includes a honing tool 220, which is supported by the tool holder 210 and is accommodated exchangeably in the tool holder 210 as an interchangeable part. The honing tool has a tubular tool body 222, which is secured by a spindle-side end portion in a correspondingly dimensioned receiving bore of the tool holder 210. The connection between the tool holder 210, serving as a tool chuck, and the tool body 222 may be realized for example by thermal shrinking or mechanical clamping by means of a polygonal chuck, a hydraulic expansion chuck or a clamping sleeve or collet, in order to facilitate changing of the tool body. Adhesive-bonding connections are also possible.

At the opposite, free end portion of the tool body there is a cutting region, in which there is at least one honing stick 228, which can be infed radially in relation to the tool axis 214. This honing stick has an abrasive cutting material body with bound grains of abrasive material.

For the infeeding of the honing stick 228, an electromechanical expanding system is provided radially in relation to the tool axis 214. The expanding system comprises a machine-side expanding rod 310, which is arranged inside the honing spindle 120, designed as a hollow shaft, coaxially therewith, and is displaceable by means of an expanding drive 320 in relation to the honing spindle axially (i.e. parallel to the spindle axis 122) in the direction of the honing tool or in the opposite direction. The expanding rod is secured against rotation with respect to the honing spindle with the aid of a conjoint rotating means 124, and when there is rotation of the honing spindle rotates along with it at the same rotational speed. The expanding drive 320, which is only shown schematically in FIG. 1, is formed by an electric motor, which is secured to the upper end of the spindle housing coaxially in relation to the spindle axis (compare DE 102 25 514 B4).

A tool-side end portion 314 of the expanding rod 310 protrudes into the inside of the tool receptacle 126 and passes completely through the portion provided with the internal thread. In the installed state of the arrangement comprising the honing spindle and the honing tool arrangement, the end portion 314 protrudes far into the inside of the tool holder 210.

On the side of the honing tool, the expanding system comprises a tool-side expanding element 330, which inside the tubular tool body is guided axially displaceably therein, and has at its spindle-remote end a beveled surface 332, which is in sliding contact with a corresponding beveled surface on the inner side of a honing stick carrier. By axial displacement of the tool-side expanding element in the direction of the tool, the honing stick 228 can consequently be infed radially outward against the force of a restoring spring. An adjusting movement in the opposite direction leads to a reduction of the effective diameter of the honing tool.

The spindle-side end of the tool-side expanding element 330 has a threaded journal with an external thread, which, for connection to the machine-side expanding rod 310, is screwed into a threaded bore at the end face of the expanding rod. In this way, a releasable connection that can be subjected to tensile and compressive loading is established between the machine-side expanding rod and the tool-side expanding element 330 of the expanding system.

A control device 400 of the honing machine serves for controlling the operating movements of the honing spindle and the expanding system. The rotary drive 140 and the lifting drive 150 for the honing spindle and also the expanding drive 320 of the expanding system are connected to the control device.

The honing machine also has a force measuring system, which allows the measurement of forces that occur at a suitable location within the expanding system and allow inferences to be made about the pressing force with which the abrasive outer surface of the honing stick is pressed against the inner side of the machined bore hole during the machining. The force measuring system comprises a force sensor 500 for generating an electrical sensor signal proportional to the pressing force and also a transmission path for transmitting the sensor signal or a signal derived therefrom to the control device 400.

The force sensor 500 is provided in the region of the tool-side end portion 314 of the machine-side expanding rod, in the direct vicinity of the connecting point to the tool-side expanding element 330. The axial distance from the tool-side expanding element is less than five times, in particular less than twice, the diameter of the expanding rod 310. In the operationally installed state of the honing machine, the force sensor is deep within the tool holder 210, beyond the threaded portion engaging in the tool receptacle.

The force sensor is designed for measuring the force acting in this region in the axial direction of the solid expanding rod. The force sensor may for example have one or more strain gages, which are secured to the tool-side end portion by means of inelastic adhesive or in some other way and can record the elastic axial stretching or compressing of the end portion. It is also possible that the force sensor has one or more piezoelectric elements.

The force sensor 500 is located at a point in the flux of force of the expanding system that is located in the direct vicinity of the expanding element 330 of the honing tool, but nevertheless is provided on a machine-side element of the honing machine, that is to say the machine-side expanding rod. Since no structurally necessitated elastic compliance is provided between the cutting material bodies on the honing tool and the location of the force sensor, the signal emitted by the force sensor is to the greatest extent proportional to the pressing force between the cutting material body and the inner wall of the bore hole, and is consequently a reliable measure of this pressing force or the associated reaction force. At the same time, however, the force sensor is provided on a component (expanding rod) that belongs to the honing machine and can remain on the honing machine when a tool change is made. In this way it is not necessary to integrate a force sensor in the honing tool and provide corresponding devices for signal transmission between the honing tool and the control.

In the case of the exemplary embodiment, the transmission path for transmitting signals between the force sensor 500 and the control device 400 comprises two physically contactlessly operating telemetric transformer units 520, 540 and leads from the force sensor 500 to the control device 400 by way of or through the tool holder 210, while bypassing the honing spindle 120 and the spindle housing 130.

Figure 2:
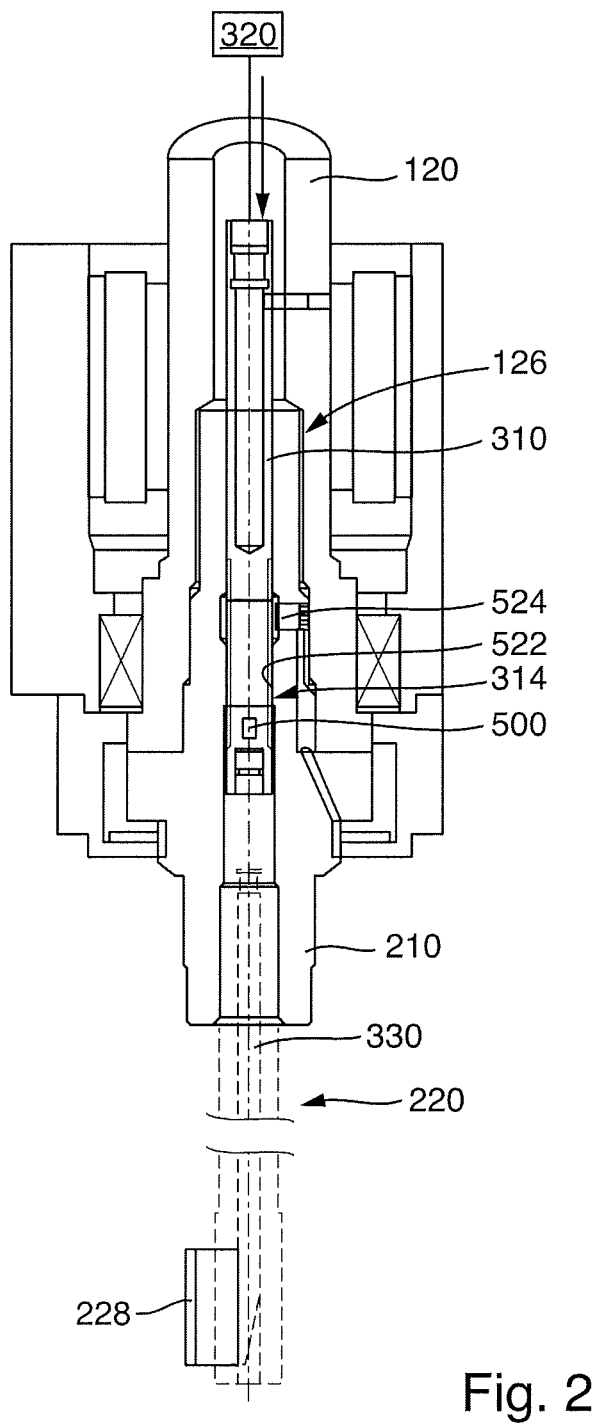
FIG. 2 shows the detail from FIG. 1 with the fully extended expanding rod of the infeeding system.

An inductive first transformer unit 520 has on the expanding rod side a first transformer element 522 in the form of an axially elongate circular antenna, which encloses the expanding rod and the axial length of which is greater than the axial adjusting range of the expanding rod between the fully retracted position (FIG. 1) and the fully extended position (FIG. 2). The axial length here is approximately three to five times the diameter of the expanding rod. Between the force sensor 500 and the first transformer element there is a sensor signal amplifier, secured centrally in the expanding rod. The corresponding second transformer element 524 is formed by an antenna that is provided radially with respect to the circular antenna on the inner side of the tool holder 210 in such a way that a small air gap remains between the transformer elements. On account of the axial length of the circular antenna 522, there is transmission contact between the transformer elements in every axial position of the expanding rod. The first transformer element is also referred to here as the axial transformer unit, because it ensures physically contactless transmission contact independently of the axial relative position of the expanding rod and the tool holder.

The second transformer unit 540 is designed as a physically contactlessly operating inductive rotating transformer. The first transformer element 542 of the second transformer unit 540 is located on the outer side of a cylindrical portion of the tool holder 210 and is connected to the second transformer element 524 of the first transformer unit 520 by way of an electrical line. Radially opposite there is a second transformer element 544, which is mounted such that it is fixed to the housing and is likewise designed in the form of a circular antenna that is closed in the circumferential direction. The second transformer element is secured to a housing base 135, which is screwed onto the tool-side end face of the spindle housing 130 and can be easily removed from it whenever required.

In order to adapt the entire electronics near the sensor and the units of the transmission path appropriately to the ambient conditions or protect them from ambient influences, all of the elements are encapsulated by means of synthetic resin or the like and made to conform to the appropriate type of protection.

The force measuring system has a number of advantageous special features. The force sensor 500 is located in the flux of force of the expanding system in the direct vicinity of the coupling point between the machine-side expanding rod and the tool-internal expanding element, and can record both compressive forces and tensile forces in the axial direction (parallel to the spindle axis). The fact that there are no transitions with associated mechanical play between the force sensor and the contact point between the cutting material bodies and the inner wall of the bore hole and no elements that are elastically compliant in the direction of the flux of force means that the axial forces measured at the location of the force sensor are for all practical purposes proportional to the pressing force or the corresponding reactive forces that are exerted by the workpiece on the cutting material bodies pressed against it. Consequently, the pressing force is directly accessible, and with it also the decisive cutting pressure.

The sensor signal is transmitted in the direction of the control device over a transmission path, in the vicinity of which there are no electrically active components that could disturb the signal transmission. In particular, the signal transmission does not take place in the direction of and through the rotary drive, but initially in the opposite direction, that is to say in the direction of the honing tool. As a result, interference-free signal transmission is ensured.

The two physically contactless telemetric transformer units 520, 540 that are integrated in the transmission path ensure that the signal transmission operate without wear at the transition between components that are movable in relation to one another (the expanding rod and the tool holder or the tool holder and the part fixed to the housing 135). A change of a honing tool arrangement consisting of a tool holder and a honing tool secured thereto is possible without disassembling components of the force measuring system.

In the case of the embodiment shown, when a tool change is made the tool holder 210 with the tool body 222 fastened thereto is unscrewed from the honing spindle, removed in the downward direction and replaced by another honing tool arrangement with a similarly constructed tool holder, which is screwed onto the honing spindle by means of screws. If the newly introduced tool holder has corresponding transformer elements for the telemetric signal transmission, the transmission path for the signal transmission is also restored when the tool change is made. It is also readily possible to use a tool holder that has no transmission elements of a force measuring system. The honing machine can therefore be operated with and without a force measuring system.

Otherwise, the components of the force measuring system are designed in such a way that many conventional honing machines can be retrofitted with a force measuring system by attaching suitable components. A conventional honing machine may for example have a spindle housing of the type described, but no housing base 135 screwed onto the end face. Furthermore, although a machine-side expanding rod 310 may be provided, it may not have at its end portion a force sensor with a connected first transformer unit.

For retrofitting a force measuring system, first a force sensor may be provided at the tool-side end portion of the expanding rod. Furthermore, an elongate circular antenna is pushed on axially as the first transformer and electrically connected to the sensor signal amplifier of the force sensor. The expanding rod may be unscrewed from the honing spindle for this, and screwed in again thereafter. Since a circular antenna is used, it does not matter in which rotational position the expanding rod is if it is fixedly screwed on. Furthermore, an adapted housing base with a circular antenna 544 similar to the housing base 135 is secured by means of screws onto the underside of the spindle housing.

All of the other components of the transmission path are located on the tool holder, so that the transmission path is completed by a tool holder equipped with transformer elements 524, 544 being screwed into the honing spindle.

In the case of the exemplary embodiment, the energy supply to the force sensor and the electronics connected thereto takes place by way of the transmission path by which the sensor signals are also transmitted. For this purpose, both telemetric transformer units 520, 540 are designed as bidirectional transformer units which make it possible to transmit signals from the force sensor in the direction of the control unit and energy for supplying electrical power to the force sensor and the electronics connected thereto from the outside in the direction of the force sensor. Thus, all of the elements within the transmission path can be made as passive elements. This dispenses with the need for any maintenance effort with respect to an active energy supply to the individual elements by batteries or rechargeable batteries. Antennas, sensors etc. do not have to be calibrated particularly to one another, and consequently can be exchanged without any problem in the event of servicing.

Consequently, in the embodiment telemetric force measurement is realized in the honing spindle at the expanding rod.

In the exemplary embodiment, all of the telemetric transformer units operate inductively in the near field, i.e. over relatively small distances in the range of millimeters or a few centimeters. In certain cases, it would also be possible to provide a telemetric transmission path with devices for radio transmission between the force sensor and the evaluation unit. In this way, greater distances between the cooperating transformer units, for example distances up to the order of several meters or more, may optionally be realized.

The invention claimed is:

1. A honing machine for honing rotationally symmetrical bore holes in workpieces comprising:
   a honing spindle, which is movably mounted in a spindle housing, is rotatable about a spindle axis by means of a rotary drive, can be driven in an oscillating manner parallel to the spindle axis by means of a lifting drive and has at a tool-side end means for securing a honing tool arrangement,
   which has a tool body carrying at least one honing element, which by axial displacement of a tool-side expanding element that is axially displaceable inside the tool body can be infed radially in relation to a tool axis and can be pressed by a pressing force against an inner side of a bore hole to be machined;
   an expanding system with a machine-side expanding rod which is guided inside the honing spindle, is axially displaceable by means of an expanding drive in relation to the honing spindle and has a tool-side end portion, for coupling onto the tool-side expanding element;

a control device for controlling operating movements of the honing spindle and the expanding system; and a force measuring system with a force sensor for generating a sensor signal proportional to the pressing force and a transmission path for transmitting the sensor signal or a signal derived therefrom to the control device, wherein the force sensor is arranged in the region of the tool-side end portion of the machine-side expanding rod and is connected to the control device by way of a telemetric transmission path; and wherein the transmission path has a second transformer unit, which has a first transformer element on the honing spindle or a component that is connected or can be connected to the honing spindle for rotation therewith and a second transformer element on the spindle housing or a component that is connected or can be connected to the spindle housing for rotation therewith, the first and second transformer elements being in transmission contact in every rotational position of the honing spindle that occurs during operation.

2. The honing machine as claimed in claim 1, wherein the transmission path has at least one physically contactlessly operating telemetric transformer unit, which has a first transformer element on a first component and a second transformer element on a second component that is separate from the first component, the first and second transformer elements being in transmission contact by way of an air gap that is formed between the components, a distance between the transformer elements lying in the range below 50 mm.

3. The honing machine as claimed in claim 2, wherein the first transformer element is provided on a first component that belongs to the honing machine, while the second transformer element is arranged on a component that belongs to the honing tool arrangement.

4. The honing machine as claimed in claim 3, wherein the second component is a tool holder of the honing tool arangement.

5. The honing machine as claimed in claim 2, wherein the distance between the transfer element is in the range between 0.5 mm and 5 mm.

6. The honing machine as claimed in claim 1, wherein the transmission path has a first transformer unit, which has a first transformer element on the expanding rod and a second transformer element on the honing spindle or a component that is connected or can be connected to the honing spindle for rotation therewith, the first and second transformer elements being in transmission contact in every axial relative position of the honing spindle and the expanding rod that occurs during operation.

7. The honing machine as claimed in claim 6, wherein the first transformer unit has a circular antenna, which encloses the expanding rod.

8. The honing machine as claimed in clam 7, wherein the axial length of the circular antenna is at least as great as an axial range of adjustment of the expanding rod between a fully retracted position and a fully extended position.

9. The honing machine as claimed in claim 1, wherein the component that can be connected to the honing spindle for rotation therewith is a tool holder of the honing tool arrangement and/or in that the component that can be connected to the spindle housing for rotation therewith is a housing base that can be detached from the spindle housing.

10. The honing machine as claimed in claim 1, wherein the telemetric transmission path has at least bidirectional transformer unit, configured in such a way as to transmit signals from the force sensor in the direction of the control unit and energy for supplying electrical power to the force sensor in the direction of the force sensor.

11. A honing machine for honing rotationally symmetrical bore holes in workpieces comprising:

a honing spindle, which is movably mounted in a spindle housing, is rotatable about a spindle axis by means of a rotary drive, can be driven in an oscillating manner parallel to the spindle axis by means of a lifting drive and has at a tool-side end means for securing a honing tool arrangement, which has a tool body carrying at least one honing element, which by axial displacement of a tool-side expanding element that is axially displaceable inside the tool body can be infed radially in relation to a tool axis and can be pressed by a pressing force against an inner side of a bore hole to be machined;

an expanding system with a machine-side expanding rod, which is guided inside the honing spindle, is axially displaceable by means of an expanding drive in relation to the honing spindle and has a tool-side end portion, for coupling onto the tool-side expanding element;

a control device for controlling operating movements of the honing spindle and the expanding system; and a force measuring system with a force sensor for generating a sensor signal proportional to the pressing force and a transmission path for transmitting the sensor signal or a signal derived therefrom to the control device, wherein the force sensor is arranged in the region of the tool-side end portion of the machine-side expanding rod and is connected to the control device by way of a telemetric transmission path; and wherein in that the honing spindle has a tool receptacle for receiving a tool holder of the honing tool arrangement, the end portion of the expanding rod that is provided with the force sensor reaching into the region of the tool receptacle in such a way that the force sensor is located inside the tool holder when the tool holder is secured to the honing spindle.

* * * * *